(12) United States Patent
Munroe et al.

(10) Patent No.: US 7,520,062 B2
(45) Date of Patent: Apr. 21, 2009

(54) LIGHT-PLANE PROJECTING APPARATUS AND LENS

(75) Inventors: Jay Munroe, Watseka, IL (US); Haizhang Li, Orlando, FL (US); Yaping Liu, Newark, DE (US)

(73) Assignee: Robert Bosch Tool Corporation, Mount Prospect, IL (US)

( * ) Notice: Subject to any disclaimer, the term of this patent is extended or adjusted under 35 U.S.C. 154(b) by 0 days.

(21) Appl. No.: 11/585,931

(22) Filed: Oct. 25, 2006

(65) Prior Publication Data

US 2007/0124947 A1    Jun. 7, 2007

Related U.S. Application Data

(60) Provisional application No. 60/742,532, filed on Dec. 6, 2005.

(51) Int. Cl.
*G01C 15/00* (2006.01)
(52) U.S. Cl. .................. 33/286; 33/DIG. 21
(58) Field of Classification Search ............. 33/286, 33/291, DIG. 21; 356/708, 718, 719; 385/901
See application file for complete search history.

(56) References Cited

U.S. PATENT DOCUMENTS

| | | | |
|---|---|---|---|
| 3,507,565 A | 4/1970 | Alvarez et al. ............... 351/17 |
| 3,612,700 A | 10/1971 | Nelson ....................... 356/153 |
| 3,801,205 A | 4/1974 | Eggenschwyler ........... 356/138 |
| 3,858,984 A | 1/1975 | Denton et al. |
| 3,873,210 A | 3/1975 | Konopka .................... 356/138 |
| 3,936,197 A | 2/1976 | Aldrink et al. .............. 356/250 |
| 3,964,824 A | 6/1976 | Dixon ........................ 350/190 |
| 4,003,074 A | 1/1977 | Yonezu et al. ............... 357/74 |
| 4,007,992 A | 2/1977 | Petrohilos et al. ........... 356/160 |
| 4,106,207 A | 8/1978 | Boyett et al. ................. 33/286 |
| 4,111,564 A | 9/1978 | Trice, Jr. .................... 356/247 |
| 4,130,362 A | 12/1978 | Lill et al. .................... 356/152 |
| 4,374,365 A | 2/1983 | Kilcy |

(Continued)

FOREIGN PATENT DOCUMENTS

CN    CH 675037    8/1990

(Continued)

OTHER PUBLICATIONS

Lasermark, Gizmo 4 Single Button Lite, PB, Service Manual 2004, rev. 03.

(Continued)

*Primary Examiner*—R. A. Smith
(74) *Attorney, Agent, or Firm*—Pillsbury Winthrop Shaw Pittman LLP

(57) ABSTRACT

A non-cylindrically surfaced lens converts a collimated light beam into a light plane that increases a light intensity toward distal portions of the light plane's arc so as to substantially uniformly project a reference light line onto a reference surface onto which the light plane is projected. The non-cylindrically surfaced lens has first and second surfaces that remain constant over at least a portion of the z direction length of the lens. The second surface defines a multiple-radius curve in an x,y plane. The lens may be incorporated into a self-leveled optical device that projects a reference light line onto a reference surface at a predetermined angle relative to horizontal.

41 Claims, 4 Drawing Sheets

U.S. PATENT DOCUMENTS

| | | | | |
|---|---|---|---|---|
| 4,448,528 A | | 5/1984 | McManus | 356/250 |
| 4,471,530 A | | 9/1984 | Kirven | 33/174 |
| 4,578,870 A | | 4/1986 | Cooke | 33/288 |
| 4,624,534 A | | 11/1986 | Amano | 350/358 |
| 4,679,937 A | | 7/1987 | Cain et al. | 356/138 |
| 4,693,567 A | * | 9/1987 | Ozaki | 359/710 |
| 4,703,563 A | | 11/1987 | Hoshino et al. | 33/227 |
| 4,767,208 A | | 8/1988 | Cain et al. | 356/138 |
| 4,818,263 A | | 4/1989 | Mitch | 65/2 |
| 4,826,299 A | | 5/1989 | Powell | 350/432 |
| 4,836,669 A | | 6/1989 | Teach | 350/618 |
| 4,836,671 A | | 6/1989 | Bautista | 356/1 |
| 4,973,158 A | | 11/1990 | Marsh | 356/247 |
| 4,993,161 A | | 2/1991 | Borkovitz | 33/291 |
| 5,012,585 A | | 5/1991 | DiMaggio | 33/286 |
| 5,095,386 A | * | 3/1992 | Scheibengraber | 359/668 |
| 5,144,486 A | | 9/1992 | Hart | 359/629 |
| 5,144,487 A | | 9/1992 | Hersey | 359/629 |
| 5,163,229 A | | 11/1992 | Cantone | 33/227 |
| 5,184,406 A | | 2/1993 | Swierski | 33/227 |
| 5,215,386 A | | 6/1993 | O'Dwyer | 384/537 |
| 5,243,398 A | | 9/1993 | Nielsen | 356/138 |
| 5,283,694 A | | 2/1994 | Frady | 359/719 |
| 5,307,368 A | | 4/1994 | Hamer | |
| 5,353,150 A | | 10/1994 | Mangir et al. | 359/338 |
| 5,446,635 A | | 8/1995 | Jehn | 362/259 |
| 5,459,932 A | | 10/1995 | Rando et al. | 33/286 |
| 5,539,990 A | | 7/1996 | Le | 33/283 |
| 5,572,796 A | | 11/1996 | Breda | 33/283 |
| 5,629,808 A | | 5/1997 | Powell | 359/719 |
| 5,728,509 A | | 3/1998 | Eda et al. | 430/321 |
| 5,754,582 A | | 5/1998 | Dong | 372/107 |
| 5,774,443 A | | 6/1998 | Shibano | 369/103 |
| 5,782,003 A | * | 7/1998 | Bozzo | 33/291 |
| 5,836,081 A | | 11/1998 | Orosz, Jr. | 33/290 |
| 5,864,956 A | | 2/1999 | Dong | 33/227 |
| 5,914,778 A | | 6/1999 | Dong | 356/247 |
| 5,967,645 A | | 10/1999 | Anderson | 362/259 |
| 5,999,325 A | | 12/1999 | Eda et al. | 359/619 |
| 6,005,716 A | | 12/1999 | Ligtenberg et al. | 359/618 |
| 6,035,540 A | | 3/2000 | Wu et al. | |
| 6,069,748 A | * | 5/2000 | Bietry | 359/719 |
| 6,178,035 B1 | | 1/2001 | Eda et al. | 359/326 |
| 6,351,890 B1 | | 3/2002 | Williams | 33/286 |
| 6,370,298 B1 | | 4/2002 | Koops | 385/33 |
| 6,502,319 B1 | | 1/2003 | Goodrich et al. | 33/286 |
| 6,546,636 B2 | | 4/2003 | Tamamura | 33/286 |
| 6,588,115 B1 | * | 7/2003 | Dong | 33/227 |
| 6,688,758 B2 | | 2/2004 | Thibault | 362/368 |
| 6,792,685 B1 | | 9/2004 | Ng et al. | 33/286 |
| 6,813,305 B2 | | 11/2004 | Clayton et al. | 372/96 |
| 6,914,930 B2 | * | 7/2005 | Raskin et al. | 372/109 |
| 6,931,739 B2 | | 8/2005 | Chang et al. | 33/286 |
| 7,059,057 B2 | | 6/2006 | Raskin et al. | 33/286 |
| 7,061,690 B1 | * | 6/2006 | Berger | 359/708 |
| 7,178,250 B2 | * | 2/2007 | Nash et al. | 33/286 |
| 7,268,951 B2 | * | 9/2007 | Dang et al. | 359/629 |
| 7,287,336 B1 | * | 10/2007 | Goodrich | 33/286 |
| 7,310,887 B2 | * | 12/2007 | Nash et al. | 33/286 |
| 2002/0178596 A1 | | 12/2002 | Malard et al. | 33/286 |
| 2003/0231303 A1 | | 12/2003 | Raskin et al. | 356/247 |
| 2004/0083614 A1 | | 5/2004 | Raskin et al. | 33/286 |
| 2004/0103546 A1 | | 6/2004 | Marshall et al. | 33/286 |
| 2004/0250432 A1 | | 12/2004 | Krantz | 33/286 |
| 2004/0255477 A1 | | 12/2004 | Levine et al. | 33/286 |
| 2005/0022399 A1 | | 2/2005 | Wheeler et al. | 33/286 |
| 2005/0066533 A1 | | 3/2005 | Wheeler et al. | 33/286 |
| 2006/0123641 A1 | | 6/2006 | El-Katcha et al. | 33/293 |
| 2007/0056173 A1 | * | 3/2007 | Burry et al. | 33/286 |
| 2007/0124948 A1 | * | 6/2007 | Nash et al. | 33/286 |
| 2007/0201225 A1 | * | 8/2007 | Holder et al. | 362/227 |

FOREIGN PATENT DOCUMENTS

| | | | |
|---|---|---|---|
| DE | | 930073 | 9/1993 |
| DE | | 43 20 177 A1 | 12/1994 |
| EP | | 0 102 221 B1 | 11/1988 |
| EP | | 0 729 053 A2 | 8/1996 |
| EP | | 1 508 773 A2 | 2/2005 |
| JP | | 59-19923 | 2/1984 |
| JP | | 61-149817 | 9/1986 |
| JP | | 61-253881 | 11/1986 |
| JP | | 62-34311 | 2/1987 |
| JP | | 62-279113 | 11/1988 |
| JP | | 1-18310 | 5/1989 |
| JP | | 1-158908 | 11/1989 |
| JP | | 540815 | 6/1993 |
| JP | | 2006317720 A * | 11/2006 |
| TW | | 174044 | 12/1991 |

OTHER PUBLICATIONS

European Search Report issued for European Patent Application No. 06256198.0-1236, dated May 25, 2007.

* cited by examiner

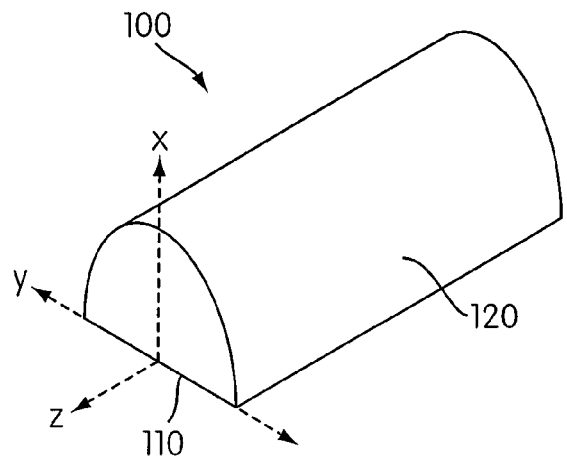
FIG. 1
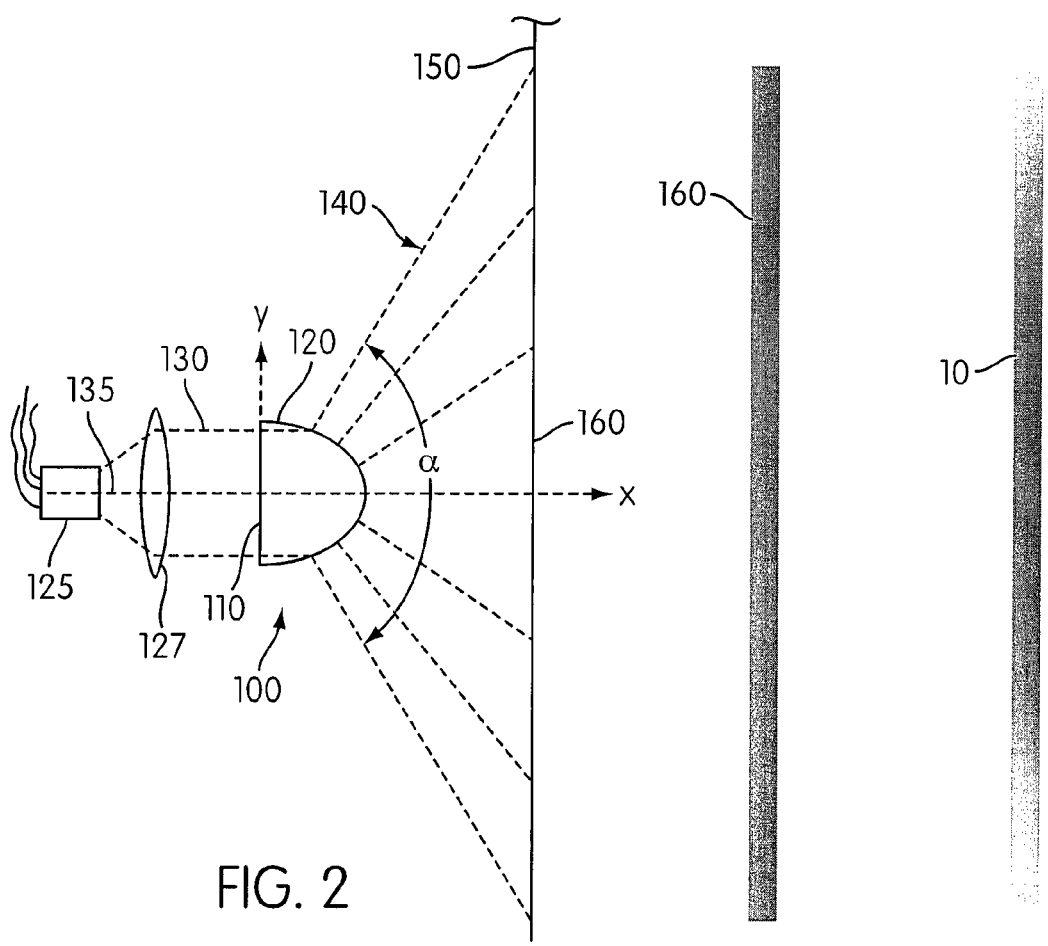
FIG. 2
FIG. 3
FIG. 4
PRIOR ART

LIGHT-PLANE PROJECTING APPARATUS AND LENS

CROSS-REFERENCE

This application claims priority to U.S. Provisional Patent Application No. 60/742,532, filed Dec. 6, 2005, titled "Light-Plane Projecting Apparatus and Lens," the entire contents of which are hereby incorporated by reference.

BACKGROUND OF THE INVENTION

1. Field of the Invention

This invention relates generally to optical elements for converting collimated light beams into light planes, and relates more particularly to the use of such optical elements in self-leveling surveying, leveling, and/or plumbing instruments for projecting horizontal and/or vertical light planes onto reference objects.

2. Description of Related Art

Conventional self-leveling instruments for projecting horizontal and/or vertical light planes onto reference objects utilize lasers and cylindrically-surfaced lenses to generate horizontal and/or vertical planes, of light. U.S. Pat. No. 5,539,990, U.S. Pat. No. 5,243,398, and Japanese Application No. 1991-90270 (Public Disclosure No. 1993-40815), published Jun. 1, 1993, disclose three such instruments. Unfortunately, as shown in FIG. 4, when such cylindrical lenses are used to project a light plane onto a wall, floor, ceiling, or other reference object as an illuminated line 10, the distal edges of the line 10 (top and bottom edges as shown in FIG. 4) fade as they extend farther away from the point on the wall that is coaxial to the input collimated light path. This makes it more difficult or impossible to see the distal extremities of the line 10. In some conventional designs, the distal extremities of the light plane are simply blocked off within the instrument, thereby wasting the cut-off portion of the light.

SUMMARY OF THE INVENTION

Accordingly, one aspect of one or more embodiments of this invention provides a line-generating lens that directs more intense light toward distal extremes of an output light plane than toward a center of the output light plane so as to provide improved visibility at the distal ends of a light line that is projected onto a wall or reference object.

Another aspect of one or more embodiments of this invention provides an optical device that includes a same, a first light generating mechanism operatively connected to the frame, and a first lens disposed in a light path of the first light generating mechanism and defining a Cartesian (x,y,z) coordinate system. The first lens has first and second surfaces with x,y coordinates that are independent of z over at least a portion of the z direction length of the first lens. The second surface defines a multiple-radius curve in an x,y plane. The lens converts light generated by the first light generating mechanism into a first light plane. The device also includes a self-leveling mechanism operatively mounted to the frame. The self-leveling mechanism tends to orient the first light plane into a predetermined angle relative to horizontal.

According to a further aspect of one or more of these embodiments, the device includes a second light generating mechanism operatively connected to the frame, and a second lens disposed in a light path of the second light generating mechanism and defining a Cartesian (x,y,z) coordinate system. The second lens has first and second surfaces with x,y coordinates that are independent of z over at least a portion of the z direction length of the second lens. The second surface of the second lens defines a multiple-radius curve in an x,y plane. The second lens converts light generated by the second light generating mechanism into a second light plane. The z axis of the first lens is perpendicular to the z axis of the second lens. The first and second light generating mechanisms each comprise a laser diode.

According to a further aspect of one or more of these embodiments, the multiple-radius curve includes at least two adjacent constant radius portions that have different radii and intersect at a point of tangency.

According to a further aspect of one or more of these embodiments, the first light generating mechanism includes a laser diode, and the device further includes a collimator disposed in the light path of the laser diode between the laser diode and the first lens. The laser diode and collimator generate a collimated light beam having a maximum width of at least 2 mm where the light beam intersects the first lens.

According to a further aspect of one or more of these embodiments, the z axis is perpendicular to the light path at a point at which the light path intersects the lens.

According to a further aspect of one or more of these embodiments, a radius of curvature of the second surface varies smoothly over at least a portion of the second surface.

The first lens may be a positive or negative lens.

According to a further aspect of one or more of these embodiments, a radius of curvature at a central portion of the second surface is smaller than a radius of curvature of a distal portion of the second surface.

According to a further aspect of one or more of these embodiments, a minimum radius of curvature of the second surface may be at least 0.5 mm or at least 1.0 mm.

According to a further aspect of one or more of these embodiments, at least a portion of the second surface defines an elliptical curve according to the equation $x^2/a^2+y^2/b^2=1$, where a is greater than b. Alternatively, at least a portion of the second surface may define a non-cylindrical curve according to the equation $x=c*y^2/(1+sqrt(1-(1+k)*c^2*y^2))+a*y^4$, wherein c, k, and a are constants.

According to a further aspect of one or more of these embodiments, the x axis of the lens is parallel to the light path, and the radius of curvature of the second surface increases as the absolute y value increases over at least a portion of the second surface.

According to a further aspect of one or more of these embodiments, first light generating mechanism is a laser generator.

According to a further aspect of one or more of these embodiments, the first light generating mechanism is a laser diode.

According to a further aspect of one or more of these embodiments, the self-leveling mechanism includes a pendulum body that is pendulously supported by the frame, and the first light generating mechanism and first lens are supported by the pendulum body for pendulous movement with the pendulum body relative to the frame. The device may also include a dampening mechanism that dampens pendulous movement of the first light generating mechanism and lens relative to the frame.

Another aspect of one or more embodiments of this invention provides an optical lens having first and second surfaces, wherein a cross-section of the lens remains constant over at least a portion of the lens in a z direction of a Cartesian (x,y,z) coordinate system, wherein the second surface defines a curve in the x,y plane according to the equation $x^2/a^2+y^2/b^2=1$, wherein a is greater than b. The number a may be at least 50% larger than b. Alternatively, at least a portion of the second surface may define a non-cylindrical curve according to the equation $x=c*y^2/(1+\sqrt{1-(1+k)*c^2*y^2})+a*y^4$, wherein c, k, and a are constants.

According to a further aspect of one or more of these embodiments, the laser diode and collimator generate a collimated light beam having a maximum width of at least 2 mm where the light beam intersects the first lens. The maximum width of the collimated light beam may be at least 4 mm where the light beam intersects the first lens.

According to a further aspect of one or more of these embodiments, a y-direction width of the collimated light beam is larger than a y-direction width of the first lens where the collimated light beam intersects the first lens.

Additional and/or alternative advantages and salient features of the invention will become apparent from the following detailed description, which, taken in conjunction with the annexed drawings, disclose preferred embodiments of the invention.

BRIEF DESCRIPTION OF THE DRAWINGS

Referring now to the drawings which from a part of this original disclosure:

FIG. 1 is a perspective view of a non-cylindrically surfaced lens according to an embodiment of the present invention;

FIG. 2 is a cross-sectional view of the lens in FIG. 1 illustrating how the lens converts collimated light into a light plane;

FIG. 3 illustrates a light intensity pattern that is generated on a reference surface by the lens in FIG. 1;

FIG. 4 illustrates a light intensity pattern that is generated on a reference surface by a conventional cylindrical lens.

DETAILED DESCRIPTION OF PREFERRED EMBODIMENTS

Figure 5:
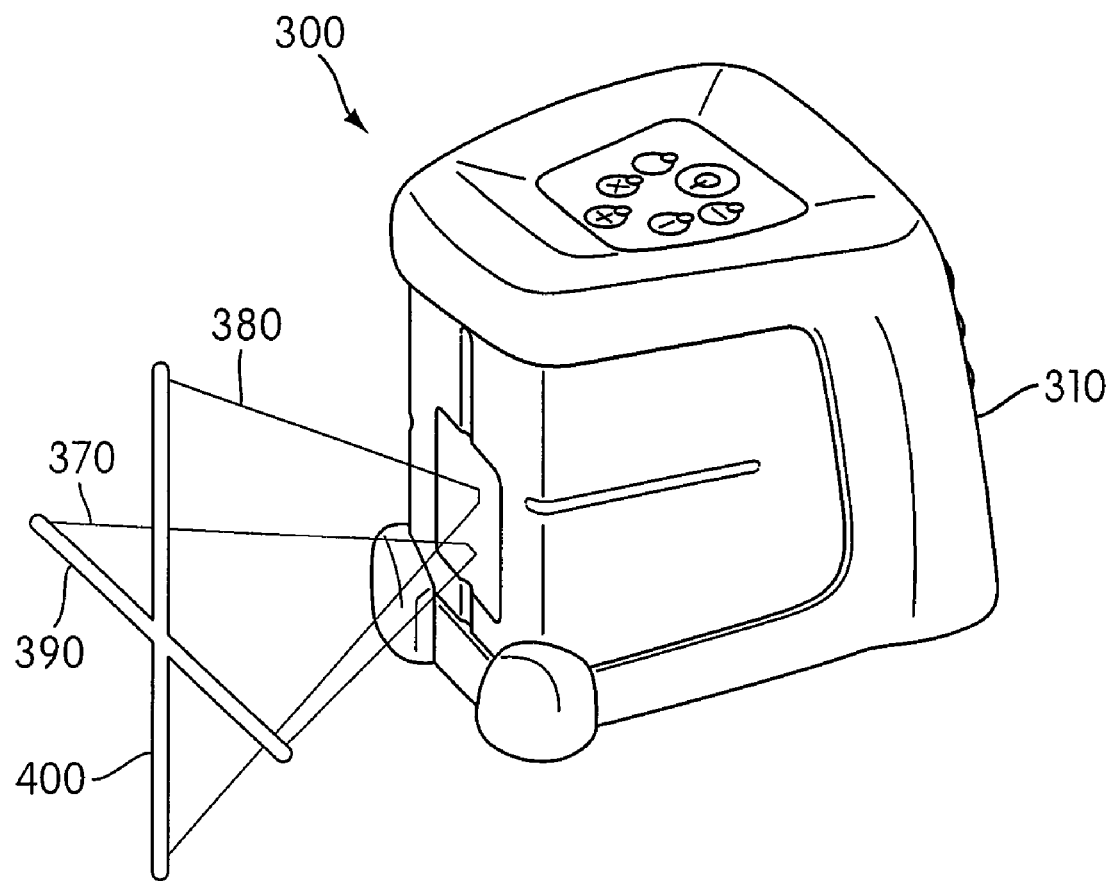
FIG. 5 is a perspective view of a level incorporating the lens in FIG. 1.

FIG. 1 illustrates a non-cylindrical lens 100 according to an embodiment of the present invention. At least a portion of the lens 100 has a constant cross-section in the z direction of the x,y,z Cartesian coordinate system shown (i.e., the x and y coordinates of the surfaces of the lens 100 are independent of their z coordinate).

As shown in FIG. 1, a first surface 110 of the lens 100 is planar and lies in (or is parallel to) the y,z plane. Alternatively, the x,y cross-sectional shape of the first surface 110 could have a variety of other shapes (e.g., constant radius curvature, varied radius curvature) without deviating from the scope of the present invention.

As shown in FIG. 1, a second surface 120 of the lens 100 has a multiple-radius smooth curvature (i.e., a curvature that includes at least two different radius curves that meet at tangent point(s)) in the x,y plane. In the illustrated embodiment, the multiple-radius curvature defines an ellipse according to the following equation: $x^2/a^2+y^2/b^2=1$, wherein constant a is greater than constant b. Constant a is the thickness of the lens 100 in the x direction, and constant b is ½ the width of the lens 100 in the y direction. In the illustrated embodiment, a equals 1.5b, but could alternatively be more or less than 50% larger than b. The minimum radius of curvature of the lens 100 equals $b^2/a$.

As shown in FIG. 2, when a laser diode 125 and collimator 127 project a collimated light beam (e.g., laser beam) 130 having a light path 135 onto the surface 110, the lens 100 expands the beam 130 in the y direction to create a light plane 140. The light path 135 is coaxial to the x axis of the lens 120. Over an arc α, the intensity of light in the light plane 140 increases with the angle between the x,z plane and the portion of the light plane 140. Beyond the arc α, the intensity may quickly decrease. Consequently, as shown in FIGS. 2 and 3, when the light plane 140 irradiates a wall 150 that is perpendicular to the z axis of the lens 100, it forms an illuminated line 160 that has a substantially constant intensity over the arc α. A comparison between the line 160 formed by the lens 100 in FIG. 3 and the line 10 formed by a conventional cylindrical lens in FIG. 4 illustrates that the lens 100 generates a higher intensity of light at a more distal end of the line 160 than a conventional cylindrical lens.

In the illustrated embodiment, the collimator 127 comprises a collimating lens. However, any other suitable collimator (e.g., collimating tube) may be used in place of the lens without deviating from the scope of the present invention.

The laser diode 125 preferably produces visible light having a wavelength in the range of 400-700 nm. The diode 125 may produce a red laser beam 130 (e.g., 635 nm wavelength±5 nm, 650 nm wavelength±5 nm, 655 nm wavelength±5 nm) or a green laser beam 130 (e.g., 532 nm wavelength±5 nm). According to various embodiments of the present invention, the diode 125 output power is between 0.5 and 20 mW, between 4 and 14 mW, about 1 mW±10%, about 4 mW±10%, about 5 mW±10%, or about 10 mW±10%. According to various embodiments of the present invention, an input voltage for the diode is between 2.7 and 6.2 volts or between 3.0 and 7.0 volts.

The width 2b of the lens 100 in the y direction is preferably greater than a width of the beam 130 in the y-direction. In the embodiment illustrated in FIG. 2, a 3.5 mm width of the beam 130 in the y-direction is slightly smaller than a corresponding 4 mm width of the lens 100. In some embodiments of the present invention, the beam 130 is greater than 1 mm wide, greater than 2 mm wide, greater than 3 mm wide, greater than 4 mm wide, or between 1 and 10 mm. As shown in FIG. 2, a laser diode 125 and collimator 127 can be inexpensively designed to create a beam 130 that is about 4 mm wide.

Laser diodes typically create light beams with oval-shaped cross-sections. The laser diode 125 is preferably oriented so that the major axis of the oval-shaped cross-section of the beam 130 is aligned with the y axis of the lens 100, thereby making the beam 130 as thin as possible in the z direction to reduce a thickness of a resulting plane of light 140. According to various embodiments of the present invention, the y-direction width of the output beam 130 is about 5 mm±1 mm or about 6 mm±1 mm. Alternatively, the collimator 127 may include an aperture plate that cuts off distal portions of the beam 130. The aperture may be, for example, square or circular and may be disposed downstream of the lens of the collimator 127 to control a shape of the collimated beam 130. A y-direction width of the aperture is preferably equal to or smaller than the width 2b of the lens 100. According to various embodiments of the present invention, the y-direction width of the aperture (and resulting width of the beam 130) is between 3 and 8 mm, is between 3 and 5 mm, is about 4.5 mm±1 mm, or is about 5.0 mm±1 mm.

According to another embodiment of the present invention, the width of the lens 100 is smaller than the width of the beam 130. For example, the outer y-direction edge of the oval-shaped beam 130 has a relatively small light intensity and does not irradiate the lens 100. In one embodiment, a laser diode and collimator generates a beam 130 having a width of about 4.3 mm in the y direction. Constant a equals 3 mm and constant b equals 2 mm such that the width of the lens 100 is 4 mm, which is slightly smaller than the width of the collimated beam 130. In this embodiment, the minimum radius of curvature of the second surface 120 (i.e., the radius of curvature at y=0) equals 1.33 mm (i.e., $b^2/a$).

According to various embodiments of the present invention, the width $2b$ of the lens 100 may be greater than 1 mm, greater than 2 mm, greater than 3 mm, greater than 4 mm, greater than 5 mm, or between 1 mm and 20 mm. According to various embodiments of the present invention the minimum radius of curvature of the second surface 120 may be greater than 0.1 mm, greater than 0.25 mm, greater than 0.5 mm, greater than 1.0 mm, greater than 1.5 mm, or between 0.25 and 10 mm.

Although the illustrated second surface 120 defines an ellipse, the second surface 120 could have any other suitable multiple-radius curvature (e.g., a curvature with two or more distinct constant radius portions joined at a point or points of tangency; a smooth curvature in which the radius of curvature varies over at least a portion of the curve; a parabola ($x=a-by^2$ where a and b are constants); the curvature of the lens 510 discussed below). The first and second surfaces 110, 120 are preferably shaped so that light intensity increases toward the distal ends of the arc $\alpha$. In one embodiment, a radius of curvature of the second surface 120 is smaller at a central portion of the second surface 120 (i.e., at the center of the arc $\alpha$; at y=0) than at distal portions of the second surface 120 (i.e., at the outer portion of the arc $\alpha$; at larger y values). According to another embodiment of the present invention, the radius of curvature of the second surface 120 increases as the absolute y value increases.

In the illustrated embodiment, the first and second surfaces 110, 120 intersect at an angle and define a half-ellipse in the x,y plane. Alternatively, the first and second surfaces 110, 120 could intersect at points of tangency, for example, if the surfaces 110, 120 defined a complete ellipse.

The above explanation assumes that an ideal input collimated light beam 130 has a constant intensity across its rectangular cross-section. Non-ideal light sources, such as laser diodes, generate non-ideal intensity beams that frequently are ovular in shape. If the y-direction width of the width of the beam 130 is not significantly larger than the y-direction width of the lens 110, the ovular beam 130 may irradiate lower intensity light onto the outer-y-direction portions of the lens 100 and cause the light plane 140 to have proportionally less intensity toward the distal portions of the arc $\alpha$. The curvature of the lens 100 nonetheless increases the actual intensity of the light plane 140 at the distal portions of the arc $\alpha$ relative to conventional cylindrical lenses.

The lens 100 is well-suited for use in surveying and leveling/plumbing laser instruments because the lens 100 provides greater intensity light at distal ends of the arc $\alpha$ and distal portions of a corresponding light line that is projected onto a reference surface than conventional cylindrical lenses. For example, according to several embodiments of the present invention, lenses 100 replace the cylindrical lenses in the self-leveled laser instruments described in U.S. Pat. No. 5,539,990, U.S. Pat. No. 5,243,398, and Japanese Application No. 1991-90270 (Public Disclosure No. 1993-40815), the entire contents of which are hereby incorporated herein by reference.

Figure 6:
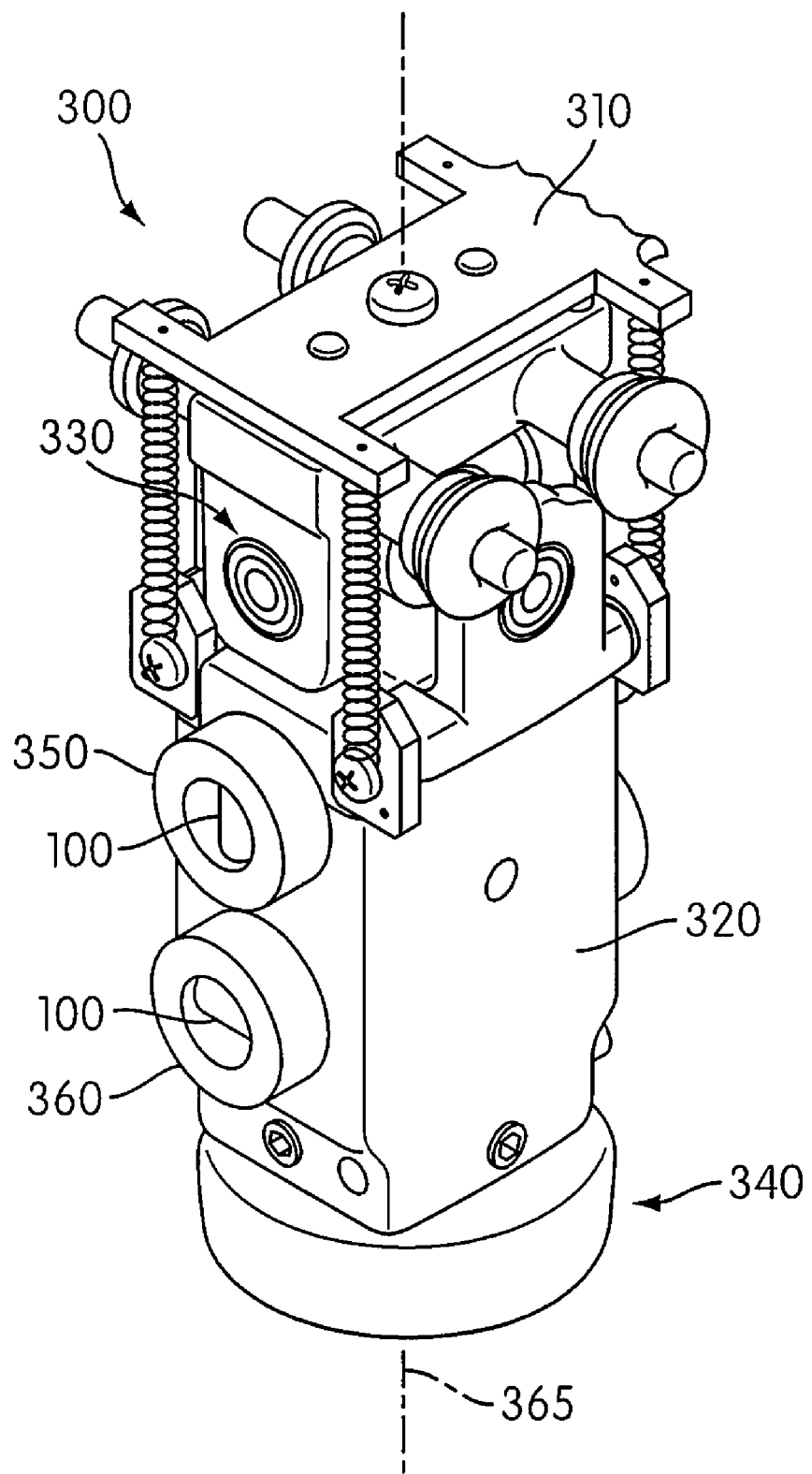
FIG. 6 is a partial perspective view of the level in FIG. 5.
Figure 7:
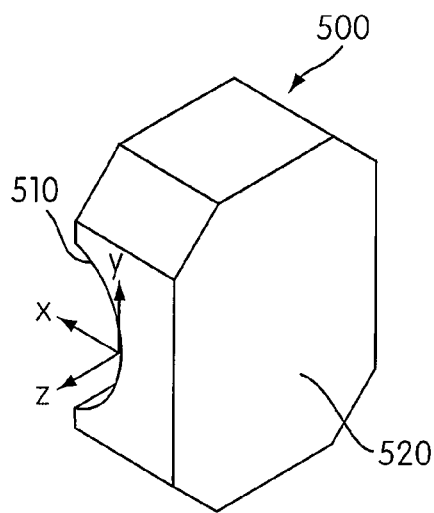
FIG. 7 is a perspective view of a negative aspherical lens according to an alternative embodiment of the present invention.
Figure 8:
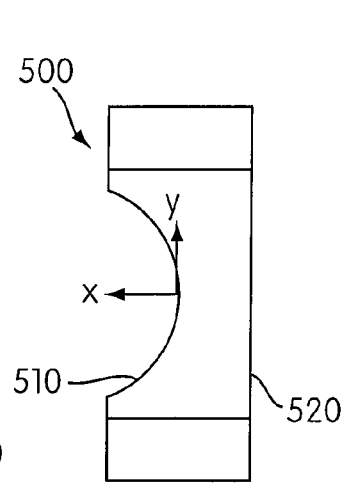
FIG. 8 is a side view of the lens in FIG. 7.
Figure 9:
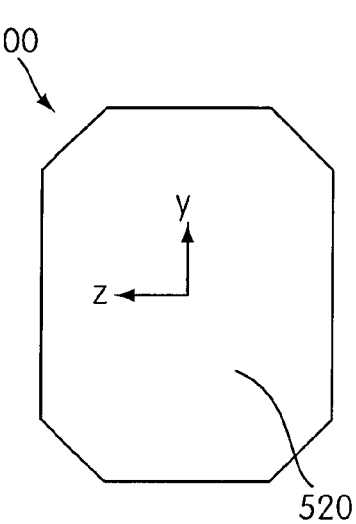
FIG. 9 is a front view of the lens in FIG. 7.

According to another embodiment of the present invention, lenses 100 are incorporated into a self-leveling, light-plane projecting level 300 as shown in FIGS. 5 and 6. As shown in FIG. 6, the level 300 includes a housing 310 and a pendulum body 320 suspended from the housing 310 by a gimbal 330 or other pendulous connection. The pendulum body 320 and housing 310 include a magnetic damper 340. Laser diodes 350, 360 are mounted to the pendulum body 320 so that the beam axes of the diodes 350, 360 extend horizontally (i.e., perpendicular to a plumb vertical line defined by the pendulum). In the illustrated embodiment, the beam axes of the diodes 350, 360 are parallel to each other. Collimators are preferably provided in the light path of the diodes 350, 360 to collimate the light. A first lens 100 is disposed in front of the diode 350 in the diode's light path such that the z axis of the lens 100 extends vertically (i.e., parallel to a plumb line 365 of the pendulum body 320). As shown in FIG. 5, the diode 350 and first lens 100 generate a horizontal light plane 370. As shown in FIG. 6, a second lens 100 is disposed in front of the diode 360 in the diode's light path such that the z axis of the second lens 100 extends horizontally. As shown in FIG. 5, the diode 360 and second lens 100 generate a vertical light plane 380. Use of the lenses 100 in the level 300 increases an intensity of the distal portions of the light planes 370, 380 to make long and/or generally-uniformly intense illuminated lines 390, 400 on a wall.

Additional diodes and lenses 100 may mount to the pendulum body 320 in different orientations to provide additional useful light planes (e.g., a horizontal or vertically oriented laser diode having a beam axis that is orthogonal to the beam axes of the laser diodes 350, 360, wherein the lenses 100 in front of such additional diode(s) are horizontally or vertically oriented and/or have z axes that are orthogonal to one or both of the z axes of the first and second lenses 100). Additional diodes and lenses may mount to the pendulum at non-right angles to other diodes and/or lenses.

While the illustrated level 300 generates horizontally and vertically oriented light planes, the level 300 may be modified to create a light plane in any other desirable orientation relative to horizontal. For example, the z axis of a lens 100 may be oriented at a 45 degree angle relative to horizontal so that the lens generates a light plane at a 45 degree angle relative to horizontal. The level 300 may include an adjustment mechanism that enables an operator to selectively choose an angle of the output light plane (e.g., by modifying the orientation of a lens 100).

While the illustrated level 300 utilizes a pendulum to self-level the level 300, any other suitable type of self leveling mechanism (e.g., a servo-leveled level; a fluid body-leveled level (see, e.g., U.S. Pat. No. 5,184,406)) may be used without deviating from the scope of the present invention.

While the illustrated level 300 utilizes a magnetic dampener 340 to dampen movement of the pendulum (and laser diodes 350, 360 and lenses 100), any other suitable dampener may alternatively be used without deviating from the scope of the present invention (e.g., gyroscope). Alternatively, a dampener may be omitted altogether.

While the illustrated level 300 utilizes laser diodes 350, 360 to generate light, any other suitable light generating mechanism may alternatively be used without deviating from the scope of the present invention (e.g., LEDs, incandescent bulbs, gas lasers, etc.). However, it is nonetheless preferred that such light generating mechanism generate monochromatic light.

While the illustrated level 300 utilizes a separate light generating mechanism to generate each light plane, a single light generating mechanism may alternatively be used to generate plural light planes (e.g., via beam splitting, dividing mirrors or lenses, etc.). See, e.g., U.S. Pat. No. 5,459,932; Japanese Application No. 1991-90270 (Japanese Public Disclosure No. 1993-40815). Moreover, plural light generating mechanisms may be used to generate different arcs within a single light plane (e.g., to create a 360 degree light plane).

As would be understood by one of ordinary skill in the art, various optical components (e.g., mirrors, lenses) may alter a direction of the light path 135. As used herein, the direction of the light path 135 (and other components such as the beam 130, etc.) is determined at a position where the light path 135 intersects the component whose position is recited relative to the light path 135. For example, as shown in FIG. 2, if a 45 degree mirror is disposed between the collimator 130 and the lens 100 to rotate the light path 135 by 90 degrees, the orientation of the lens 100 would be shifted by 90 degrees so that the first surface 110, z-axis, and y-axis all remain perpendicular to the light path 135 where the light path 135 intersects the lens 100. Consequently, the first surface 110 is perpendicular to the light path 135 despite the fact that the first surface 110 is not perpendicular to the portion of the light path 135 disposed between the diode 135 and collimator 127.

FIGS. 7-10 illustrate a negative aspherical lens 500 according to an alternative embodiment of the present invention. The lens 500 has a negative focal length to convert a collimated light beam into a light plane. The lens 500 may be used in place of the lens 100 in the level 300. Alternatively, the lens 500 may be used in other products where it is desired to convert a collimated beam of light into a light plane. For example, such a lens 500 may be used in the devices described in U.S. Patent Application Publication No. 2005/0078303 or in U.S. patent application Ser. No. 11/477,589, titled "ADHESIVE MOUNT FOR A LEVELING DEVICE AND A LEVELING DEVICE," filed Jun. 30, 2006, both of which are hereby incorporated by reference in their entirety. Specifically, the lens 500 can be positioned in front of the laser diode in the disclosed devices to convert a beam of light into a plane of light for forming a line on a surface.

The lens 500 includes a concave, aspherical first surface 510 and a planar second surface 520. The second surface 520 may alternatively have a non-planar contour without deviating from the scope of the present invention. The aspherical first surface 510 has a multi-radius curvature in the x,y plane. The multi-radius curvature of the first surface 510 preferably has a smooth curvature in the x,y plane, the curvature being independent of z position. In the illustrated embodiment, the curvature is defined by the following equation:

$$x = c*y^2/(1+\mathrm{sqrt}(1-(1+k)*c^2*y^2)) + a*y^4$$

Figure 10:
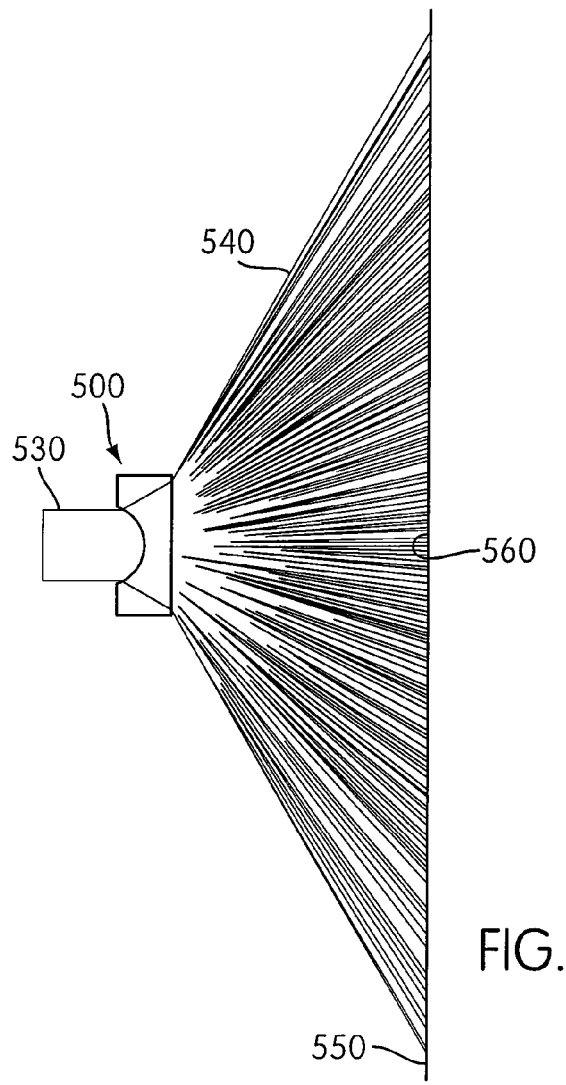
FIG. 10 is a side view ray trace of the lens in FIG. 7 illustrating how the lens converts collimated light into a light plane.

According to one embodiment, c=0.41322, k=−0.2108, and a=−0.002886. The lens 500 may comprise any suitable optical material, such as ZF6 or SF4. The surfaces 510, 520 are preferably polished and coated with an anti-reflection coating for optimum transmission at a wavelength of light to be passed through the lens (e.g., 635 nm to 670 nm). FIG. 10 shows a ray trace of how the lens 500 converts a collimated light beam 530 into a light plane 540 that intersects a surface 550 to generate an illuminated line 560. In comparison with a spherical or cylindrical lens (which produces a line of diminishing intensity as the line extends away from the central axis of the lens), the lens 500 preferably distributes higher intensity light toward the outer peripheries of the light plane 540 so as to increase illumination uniformity of the illuminated line 560.

The foregoing description is included to illustrate the operation of the preferred embodiments and is not meant to limit the scope of the invention. To the contrary, those skilled in the art should appreciate that varieties may be constructed and employed without departing from the scope of the invention, aspects of which are recited by the claims appended hereto.

What is claimed is:

1. An optical device comprising:
a frame;
a first light generator;
a first lens disposed in a first light path generated by the first light generator and defining a Cartesian (x,y,z) coordinate system, the first lens having first and second surfaces with x,y coordinates that are independent of z over at least a portion of the z direction length of the first lens, the second surface defining a multiple-radius curve in an x,y plane, the lens converting light generated by the first light generator into a first light plane that includes a light arc; and
a self-leveling mechanism mounted to the frame, the self-leveling mechanism tending to orient the first light plane into a predetermined angle relative to horizontal,
wherein the first lens is shaped and oriented relative to the first light path so as to direct more intense light toward distal ends of the arc than at a central portion of the arc, and
wherein the first light generator and first lens are constructed and positioned to transmit light generated by the first light generator through the first and second surfaces to create the first light plane.

2. The optical device of claim 1, further comprising:
a second light generator; and
a second lens disposed in a light path of the second light generator and defining a Cartesian (x,y,z) coordinate system, the second lens having first and second surfaces with x,y coordinates that are independent of z over at least a portion of the z direction length of the second lens, the second surface of the second lens defining a multiple-radius curve in an x,y plane, the second lens converting light generated by the second light generator into a second light plane,
wherein the z axis of the first lens is perpendicular to the z axis of the second lens, and
wherein the first and second light generators each comprise a laser diode.

3. The optical device of claim 1, wherein a radius of curvature of the second surface varies smoothly over at least a portion of the second surface.

4. The optical device of claim 1, wherein a radius of curvature at a central portion of the multiple-radius curve is smaller than radii of curvature at distal portions of the multiple-radius curve.

5. The optical device of claim 1, wherein a minimum radius of curvature of the second surface is at least 0.5 mm.

6. The optical device of claim 5, wherein the minimum radius of curvature of the second surface is at least 1.0 mm.

7. The optical device of claim 1, wherein the first lens comprises a negative aspherical lens.

8. The optical device of claim 1, wherein the x axis of the lens is coaxial to the first light path at a point at which the first light path intersects the first lens, and wherein the radius of curvature of the second surface increases as the absolute y value increases over at least a portion of the second surface.

9. The optical device of claim 1, wherein the self-leveling mechanism comprises a pendulum body that is pendulously supported by the frame, and wherein the first light generator and first lens are supported by the pendulum body for pendulous movement with the pendulum body relative to the frame.

10. The optical device of claim 1, wherein:
the first light generator comprises a first laser diode;
the device further comprises a first collimator disposed in the first light path upstream from the first lens; and
the first laser diode and first collimator generate a collimated light beam having a maximum width of at least 2 mm where the light beam intersects the first lens.

11. The optical device of claim 10, further comprising:
a frame; and
a pendulum body pendulously supported by the frame, wherein the first laser diode, first collimator, and first lens are mounted to the pendulum body.

12. The optical device of claim 10, wherein the maximum width of the collimated light beam is at least 4 mm where the light beam intersects the first lens.

13. The optical device of claim 10, wherein a y-direction width of the collimated light beam is larger than a y-direction width of the first lens where the collimated light beam intersects the first lens.

14. An optical device according to claim 1, wherein:
the first light path is coaxial with the x axis of the first lens, and
a radius of the multiple-radius curve at the x axis is smaller than radii of curvature of the multiple-radius curve at least one positive y value and at least one negative y value.

15. An optical device according to claim 1, wherein the first lens is symmetrical relative to the x,z plane.

16. An optical device comprising:
a frame;
a first light generator;
a first lens disposed in a first light path generated by the first light generator and defining a Cartesian (x,y,z) coordinate system, the first lens having first and second surfaces with x,y coordinates that are independent of z over at least a portion of the z direction length of the first lens, the second surface defining a multiple-radius curve in an x,y plane, the lens converting light generated by the first light generator into a first light plane that includes a light arc; and
a self-leveling mechanism mounted to the frame, the self-leveling mechanism tending to orient the first light plane into a predetermined angle relative to horizontal,
wherein the first lens is shaped and oriented relative to the first light path so as to direct more intense light toward distal ends of the arc than at a central portion of the arc, and
wherein at least a portion of the second surface defines an elliptical curve according to the equation $x^2/a^2+y^2/b^2=1$, wherein a is greater than b.

17. An optical device comprising:
a frame;
a first light generator;
a first lens disposed in a first light path generated by the first light generator and defining a Cartesian (x,y,z) coordinate system, the first lens having first and second surfaces with x,y coordinates that are independent of z over at least a portion of the z direction length of the first lens, the second surface defining a multiple-radius curve in an x,y plane, the lens converting light generated by the first light generator into a first light plane that includes a light arc; and
a self-leveling mechanism mounted to the frame, the self-leveling mechanism tending to orient the first light plane into a predetermined angle relative to horizontal,
wherein the first lens is shaped and oriented relative to the first light path so as to direct more intense light toward distal ends of the arc than at a central portion of the arc, and
wherein at least a portion of the second surface defines a non-cylindrical curve according to the equation $x=c*y^2/(1+\text{sqrt}(1-(1+k)*c^2*y^2))+a*y^4$, wherein c, k, and a are constants.

18. A method for using an optical device, the optical device comprising:
a frame;
a first light generator;
a first lens disposed in a light path of the first light generator and defining a Cartesian (x,y,z) coordinate system, the first lens having first and second surfaces with x,y coordinates that are independent of z over at least a portion of the z direction length of the first lens, the second surface defining a multiple-radius curve in an x,y plane, the lens converting light generated by the first light generator into a first light plane; and
a self-leveling mechanism mounted to the frame, the self-leveling mechanism tending to orient the first light plane into a predetermined angle relative to horizontal,
the method comprising turning on the first light generator so as to generate the first light plane that includes a light arc, wherein an intensity of the light arc at its distal ends is relatively more intense than what would be produced if a cylindrical lens were used instead of the first lens, and wherein said turning on of the first light generator causes light generated by the first light generator to transmit through the first and second surfaces to create the first light plane.

19. The method of claim 18, further comprising projecting the first light plane onto a surface such that the first light plane is substantially perpendicular to the surface, and such that the first light plane creates an illuminated line on the surface, wherein the illuminated line has a substantially constant intensity along its length.

20. The method of claim 18, wherein the multiple radius curve comprises a continuous curve.

21. The method of claim 18, wherein the light path and first light plane are coplanar where the first light path intersects the first lens.

22. The method of claim 18, wherein the x axis of the first lens is coaxial to the light path at a point at which the light path intersects the first lens.

23. An optical device comprising:
a frame;
a first light generator;
a first lens disposed in a first light path generated by the first light generator and defining a Cartesian (x,y,z) coordinate system, the first lens having first and second surfaces with x,y coordinates that are independent of z over at least a portion of the z direction length of the first lens, the second surface defining a multiple-radius curve in an x,y plane, the lens converting light generated by the first light generator into a first light plane that includes a light arc; and
a self-leveling mechanism mounted to the frame, the self-leveling mechanism tending to orient the first light plane into a predetermined angle relative to horizontal,
wherein the first lens is shaped and oriented relative to the first light path so as to direct relatively more intense light towards distal ends of the arc than a cylindrical lens, and wherein the first light generator and first lens are constructed and positioned to transmit light generated by the first light generator through the first and second surfaces to create the first light plane.

24. An optical device according to claim 23, wherein the first lens is shaped and oriented relative to the first light generator so as to direct more intense light toward distal ends of the arc than at a central portion of the arc.

25. An optical device according to claim 23, wherein the multiple-radius curve comprises an elliptical curve.

26. An optical device according to claim 23, further comprising:
a second lens disposed in a second light path generated by the device and defining a Cartesian (x,y,z) coordinate system, the second lens having first and second surfaces with x,y coordinates that are independent of z over at least a portion of the z direction length of the second lens, the second surface of the second lens defining a multiple-radius curve in an x,y plane, the second lens converting light generated by the device into a second light plane that is perpendicular to the first light plane.

27. An optical device according to claim 26, further comprising a second light generator generating the second light path.

28. An optical device according to claim 23, wherein the predetermined angle is zero, so that the self-leveling mechanism tends to orient the first light plane into a horizontal orientation.

29. The optical device of claim 23, wherein the multiple radius curve comprises a continuous curve.

30. The optical device of claim 23, wherein the first light path and first light plane are coplanar where the first light path intersects the first lens.

31. The optical device of claim 23, wherein the x axis of the first lens is coaxial to the first light path at a point at which the first light path intersects the first lens.

32. An optical device comprising:
a frame;
a light generator;
a lens disposed in a light path generated by the light generator, the lens having first and second surfaces with x,y coordinates of a Cartesian (x, y, z) coordinate system that are independent of z over at least a portion of the z direction length of the lens, the second surface defining a multiple-radius curve in an x,y plane, the lens converting light generated by the light generator into a light plane; and
a self-leveling mechanism mounted to the frame, the self-leveling mechanism tending to orient the light plane into a predetermined angle relative to horizontal,
wherein the light path is coaxial with the x axis of the lens where the light path intersects the lens, and
wherein a radius of the multiple-radius curve at the x axis is smaller than radii of curvature of the multiple-radius curve at least one positive y value and at least one negative y value.

33. An optical device according to claim 32, wherein the radius of curvature of the second surface increases as the second surface diverges from the x axis in the positive and negative y directions.

34. An optical device according to claim 32, wherein the lens is symmetrical relative to an x,z plane of the Cartesian coordinate system.

35. An optical device according to claim 32, wherein the self-leveling mechanism comprises a pendulum body that is pendulously supported by the frame, and wherein the light generator and lens are supported by the pendulum body for pendulous movement with the pendulum body relative to the frame.

36. An optical device according to claim 32, wherein the predetermined angle is zero, so that the self-leveling mechanism tends to orient the light plane into a horizontal orientation.

37. An optical device according to claim 32, wherein at least a portion of the second surface defines a non-cylindrical curve according to the equation $x=c*y^2/(1+\sqrt{1-(1+k)*c^2*y^2})+a*y^4$, wherein c, k, and a are constants.

38. The optical device of claim 32, wherein the first light generator and first lens are positioned and oriented to transmit light generated by the first light generator through the first and second surfaces to create the first light plane.

39. The optical device of claim 32, wherein the multiple radius curve comprises a continuous curve.

40. The optical device of claim 32, wherein the light path and light plane are coplanar where the light path intersects the lens.

41. The optical device of claim 32, wherein the x axis of the lens is coaxial to the light path at a point at which the light path intersects the lens.

* * * * *